United States Patent [19]

Diehl et al.

[11] 4,372,563
[45] Feb. 8, 1983

[54] PACKING SUPPORT FOR MOUNTING A WELL CASING PACKING

[75] Inventors: Robert J. Diehl, Wallis, Tex.; William L. Godare, Rohnert Park, Calif.; Frederic D. Wells, Shreveport, La.

[73] Assignee: W-K-M Wellhead Systems, Inc., Shreveport, La.

[21] Appl. No.: 315,275

[22] Filed: Oct. 26, 1981

[51] Int. Cl.³ .................. F16J 15/06; E21B 33/12
[52] U.S. Cl. ............................ 277/117; 277/124; 277/166; 277/188 R; 166/124
[58] Field of Search .............. 277/104, 108, 117–122, 277/124, 166, 178, 188 R, 188 A, 189, 198; 166/123, 124, 134, 140

[56] References Cited

U.S. PATENT DOCUMENTS

| | | | |
|---|---|---|---|
| 1,804,619 | 5/1931 | Humason | 277/177 X |
| 2,189,697 | 2/1940 | Baker | 277/188 R X |
| 3,024,845 | 3/1962 | Courad | 166/123 |
| 3,389,918 | 6/1968 | Burns | 277/118 X |
| 3,588,130 | 6/1971 | Fowler et al. | 277/166 X |

Primary Examiner—Robert S. Ward, Jr.
Attorney, Agent, or Firm—Marvin J. Marnock

[57] ABSTRACT

A packing support assembly (10) adapted to be sleeved about a well casing ("C"), or the like, and secured thereto without the need for piercing the casing wall or welding thereto. The support assembly (10) comprises an anchor ring (11) which is sleeved about the casing ("C") and secured thereto by a first fastening means in the form of a plurality of circumferentially located fastening means such as radial bores (22) and set screws (31). The anchor ring (11) is provided with flexible fingers (61) having ridged surfaces (16) which are also adapted to rip the external wall of the casing ("C"). The flexible fingers (61) are wedged inwardly to grip the casing ("C") by means of a retainer ring (71) which is threaded onto the exterior of the anchor ring (11) and provided with an internal wedging surface (75) which is slidably engageable with cooperating wedging surfaces (52) on the exterior of the flexible fingers (61) of the anchor ring (11). The gripping force is adjustable as determined by the degree of turning of the set screws (31) and the amount of rotation and threaded connection of the retainer ring (71) on the anchor ring (11). The upper annular edge (81) of the retainer ring is configured to support and retain an annular packing, or the like, thereon.

5 Claims, 4 Drawing Figures

PACKING SUPPORT FOR MOUNTING A WELL CASING PACKING

BACKGROUND OF THE INVENTION

This invention relates to a support apparatus for external mounting on a well casing or other cylindrical member of circular cross-section and, more particularly, to a packing support for mounting on a well casing to support a packing which seals the annulus between the casing and the wellhead or the bore wall of an outer casing.

To secure structures such as packing assemblies to the exterior of a casing or tubing, it is sometimes desirable or necessary to provide a support therefor which can be secured to the casing without piercing the casing wall or welding thereto and without any attachment to an external support such as, for example, a wellhead or an outer casing. This latter feature is particularly important with packing assemblies which are used for sealing between a casing and a wellhead such as a geothermal wellhead wherein the casing will characteristically move longitudinally within the wellhead in response to thermal conditions and temperature changes associated therewith. It is also essential when used as a packing support that the packing support assembly grip the casing very securely and be immovable thereon since such packings are usually subjected to very great compressive forces.

It is therefore an object of the invention to provide a support device which can be securely mounted on the smooth exterior wall of a well casing or the like without connection to any other member and which is particularly suited for supporting a packing or other apparatus in an annulus cavity such as between a casing and a wellhead.

It is also an object of the invention to provide a packing support assembly which can be securely mounted on the external wall of a casing or tubing without the need for welding or piercing the casing wall and without connection to any other member, such as a surrounding wellhead bore or outer casing.

A further object of the invention is to provide a packing support which can be securely mounted on the external wall of a casing, or the like, and is provided with a plurality of adjustable gripping means including a gripping means which may be actuated by wedge means and the gripping force of which is selectively adjustable.

SUMMARY OF THE INVENTION

A packing support assembly is provided which is adapted to be sleeved about a well casing, or the like, and secured thereto without the need for piercing the casing wall or welding thereto. The support assembly comprises an anchor ring which is sleeved about the casing and secured thereto by a first fastening means in the form of a plurality of circumferentially located fastening means such as set screws. The anchor ring is also provided with a plurality of flexible fingers having ridged surfaces which are also adapted to grip the external wall of the casing. The flexible fingers are wedged inwardly to grip the casing by means of a retainer ring which is threaded onto the exterior of the anchor ring and provided with an internal wedging surface which is slidably engageable with cooperating wedging surfaces on the exterior of the flexible fingers on the anchor ring. The gripping force is adjustable as determined by the degree of turning of the set screws and the amount of rotation and threaded connection of the retainer ring on the anchor ring. The annular edges of the retainer ring are configured to support and retain an annular packing thereon.

DESCRIPTION OF THE PREFERRED EMBODIMENT

Figure 1:
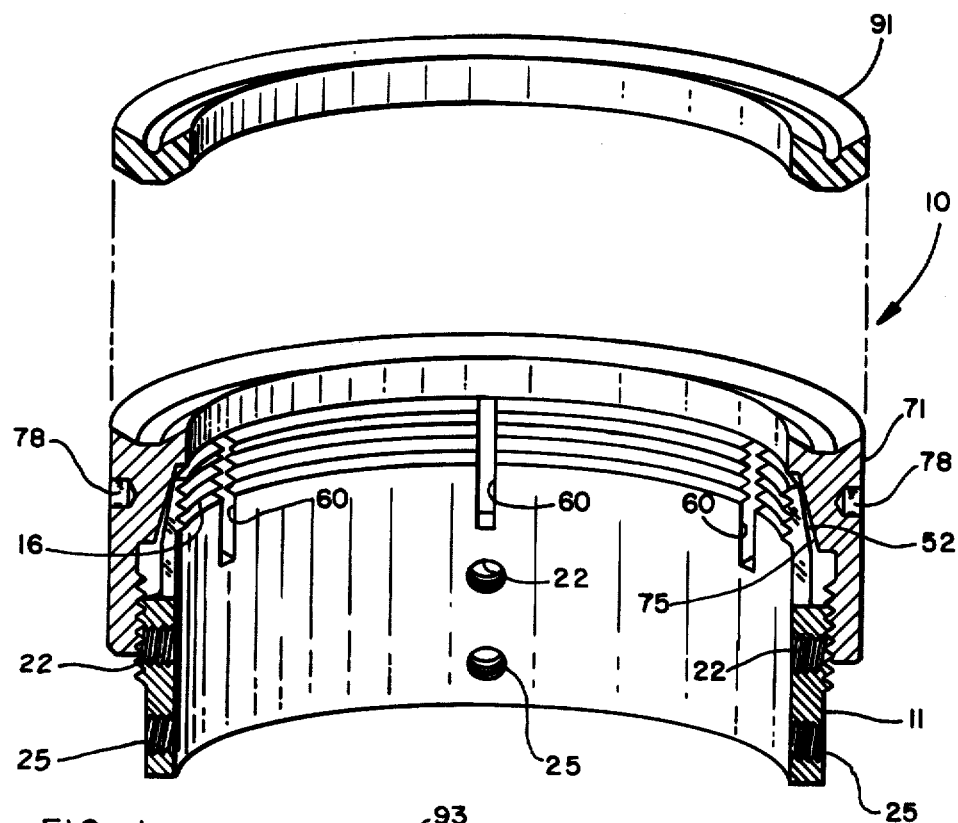
FIG. 1 is a partially exploded view showing the invention in cross-section and in perspective.
Figure 4:
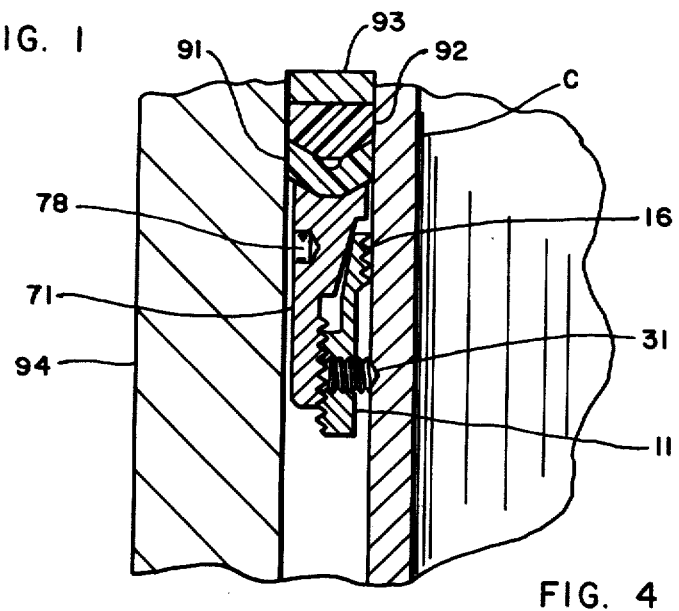
FIG. 4 is a fragmentary view in vertical cross-section, illustrating a modified form of the ring support device of this invention as installed on a well casing and supporting a packing assembly which seals the annulus between the well casing and the wellhead.
Figure 2:
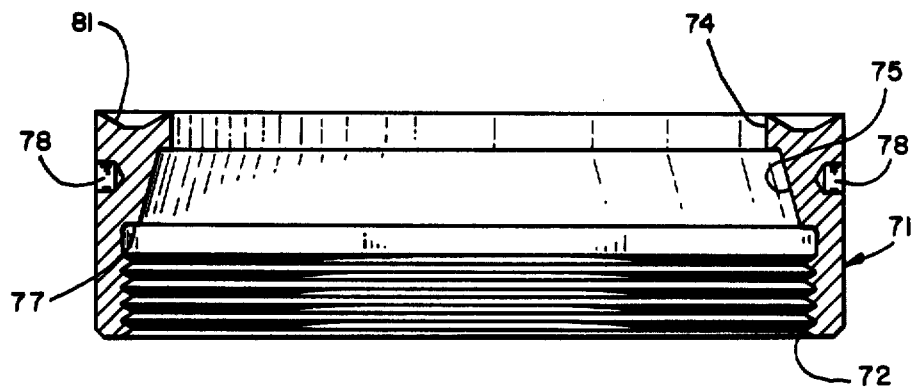
FIG. 2 is a view of the support retainer ring of the invention, in vertical cross-section through a diameter thereof.
Figure 3:
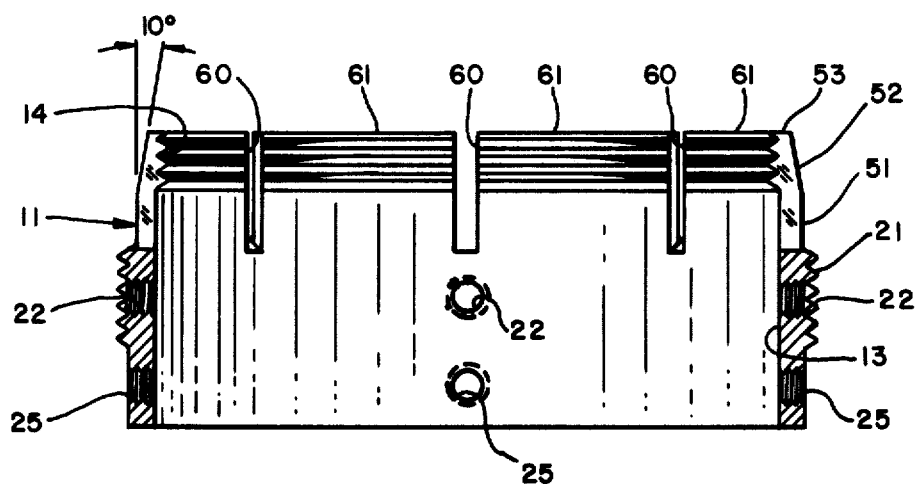
FIG. 3 is a vertical sectional view of the anchor ring member of the invention, the section being taken through a diameter thereof.

Referring more particularly to the drawings, there is shown in FIG. 1 an exploded view of a packing support assembly 10 which represents a preferred embodiment of the invention. The support assembly 10 is comprised of a lower anchor ring 11 in the general form of an annular cylindrical member of circular cross-section, and a support retainer ring 12 which is adapted to be threadedly engaged therewith. As best shown in FIGS. 1 and 4, the anchor ring 11 has a central axial bore 13 therethrough which includes an upper bore section 14 of slightly reduced diameter. Throughout the length of the bore section 14 the inner wall of the anchor ring 11 is provided with internal threads 16. The remainder of the axial bore through the anchor ring 11 is provided with a smooth wall and an enlarged diameter relative to the internally threaded bore section 14.

The anchor ring 11 is at its largest external diameter at the central portion thereof which is provided with external threads 21. A first set of threaded radial bores 22 are provided in the anchor ring 11 which extend through the threaded external wall of the central portion of the anchor ring 11 to the axial bore thereof. The lateral radial bores 22 are circumferentially and equiangularly spaced about the anchor ring 11 and their bore axes are located in the same cross-sectional plane and perpendicularly to the central axis of the anchor ring 11.

The threaded bores 11 are for the purpose of accommodating headless fasteners such as set screws 31 which can be inserted therein for securing the anchor ring 11 in a desired location on a well casing or other similar tubular element or pole. For greater anchoring strength the anchor ring 11 is provided with a second set of threaded radial bores 25 which like the radial bores 22 are also circumferentially and equiangularly spaced about the anchor ring 11 but are located beneath the radial bores 22 and near the lower end of the ring 11. As with the set of radial bores 22, the bores 25 are disposed in a cross-sectional plane perpendicular to the longitudinal axis of the ring and are adapted to receive headless fasteners or set screws therein. Preferably, the lower section of the anchor ring 11 below the threads 21 is provided with an external diameter which is less than the diameter of the threaded central portion.

The upper end portion of the anchor ring is also provided with an outer diameter which is slightly less than the central externally threaded section of the anchor ring. The upper end portion of the anchor ring 11 includes a cylindrical surface portion 51 of circular cross-section, and a frusto-conical surface 52 which extends from the upper limit of the cylindrical surface portion 51 of the ring 11 in a converging direction to the upper end 53 of the ring 11. In the particular embodiment of the invention shown herein, the frusto-conical surface 52 is defined by a cone angle of 20° which corresponds to an angle of 10° from the vertical plane and axis.

The upper end portion of the anchor ring 11 is also provided with a plurality of longitudinal slots 60 which extend from the upper end of the anchor ring 11 to the externally threaded central portion of the ring 11 and in parallel relation with the central axis of the ring 11. The slots 60 are circumferentially equiangularly spaced about the upper end of the anchor ring 11. In the embodiment of the invention illustrated herein, the slots are eight in number, one inch in length and 3/16ths of an inch in width. The slots 60 accordingly define a plurality of fingers 61, each provided with ridged inner surfaces by means of the threads 16 at their free ends whereby the fingers 61 are adapted to grip the exterior surface of a pole or tubular element such as a well casing disposed therebetween when they are flexed inwardly.

The packing support assembly 10 also includes an upper support retainer ring 71 having a central axial bore extending therethrough, the lower portion of which is provided with internal threads 72 for mating with the external threads 21 in the lower anchor ring 11. The upper end section of the support retainer ring 71 is provided with a central circular bore section 74 of lesser bore diameter than the lower section of the ring with the threads 72. The bore wall between the threads 72 and the upper bore section 74 is a frusto-conical surface 75 convergent inwardly and defined by a cone angle of approximately 30° so that its slanting surface is at 15° from the vertical plane and axis. The frusto-conical surface 75 tapers inwardly towards the upper end of the retainer ring 71 but terminates at a downward facing shoulder 77 in the axial bore of the retainer ring 71 just above the threads 72. When the support retainer ring 71 is threaded onto the lower ring 11, the inner frusto-conical surface 75 of the support retainer ring 71 is adapted to slidingly engage the external frusto-conical surface 52 of the lower anchor ring 11.

The retainer ring 71 is also provided on its external surface with blind bores 78 spaced circumferentially about the adapter. The blind bores 78 are for the purpose of accommodating a suitable gripping tool for turning the retainer ring 71 and accomplishing its threaded connection with the lower anchor ring 11. As the threaded connection between the two ring members 71 and 11 is increased, the frusto-conical surface 75 moves downwardly against the external frusto-conical surface 52 and thereby wedges the fingers 61 of the anchor ring 11 in the inward direction. For some applications the shoulder 77 provides a stop to limit the relative movement of the retainer ring 71 or the anchor ring 11.

Accordingly, the threads 16 on the inner surfaces of the tips of the fingers 61 act as gripping surfaces, or teeth which can bite into the exterior surface of a well casing or similar element. The ridges or teeth provided by the threads 16 and the fasteners 31 are formed of a harder metal than the casing.

For supporting a packing, the annular edge 81 at the upper end of the retainer ring 71 is "U-shaped" or "V-shaped" in radial cross-section for accommodating a single packing ring 91 as shown in FIG. 1 or a "chevron-type" plurality of packing rings arranged in a stacked "nested" configuration in a packing assembly supported thereon. In FIG. 4 a modified form of the support device 10 is shown installed on a casing "C" in a typical application for supporting a packing structure in a wellhead 94. Such a packing structure typically consists of a plurality of stacked sealing rings such as one or more elastomer packing rings 91, an elastomer adapter packing ring 92 and a metal retainer 93. The convex lower face of the packing ring 91 seats on the concave upper end 81 of the retainer ring 71. The packing is adapted to provide a seal between the casing exterior and the interior of the wellhead bore which is effective even though the casing moves longitudinally with respect to the wellhead in response to thermal conditions. Conventionally, the packing rings are subjected to compressive forces which cause their lateral radial expansion into a sealing engagement with the casing "C" and the inner bore wall of a wellhead 94 or outer casing which surrounds the casing "C", typically in concentric relation therewith. The compression forces may be applied by various means such as by a sleeved element around the casing which is urged downwardly against the top of the packing or possibly by a clamping means such as a bolt through the packing rings into the retainer 71. In the embodiment of the invention as shown in FIG. 4, the anchor ring is provided with only a single set of radial bores 22 and fastening screws 31. Of course, additional sets could be provided if greater anchoring strength is required.

It will thus be seen that a unique support device is disclosed herein which can be installed on the smooth unthreaded external wall of a casing or tubing for supporting a packing or the like, without the need for welding thereto or for piercing the walls of the casing or tubing. It is adapted to be secured to the casing without attachment or reliance on any other structural element such as an outer casing or wellhead. It is also provided with two separate kinds of adjustable gripping means for securely anchoring onto a casing, these are, namely, the rings of headless set screws 31 and the ring of ridged teeth provided by the threads 26 on the inner surfaces of the fingers 61. With each gripping means, the gripping force is adjustable as determined by the degree of turning of the set screws and the amount of rotation of the retainer ring. While the support device 10 has been illustrated in the application of supporting a packing, it obviously can be used to support other elements and devices on a casing, tubing, or mandrel, as the case may be.

It is also to be understood that the foregoing description of the invention has been presented for purposes of illustration and explanation and is not intended to limit the invention to the precise form disclosed as changes in details of construction may be made by those skilled in the art, within the scope of the appended claims, without departing from the spirit of the invention.

What is claimed is:

1. A support ring device adapted to be mounted in sleeved relationship to a casing or mandrel, said support ring device comprising:

an anchor ring member of a general cylindrical configuration and having an externally threaded wide diameter portion and with a plurality of threaded bores located circumferentially about said anchoring ring member and extending radially therein from the external surface of said anchor ring member to the interior thereof, said radial bores adapted to receive set screws therein which may be used to secure said anchor ring member to said casing;

a plurality of upwardly extending fingers on the upper end of said anchor ring member which are disposed circumferentially about the ring member, each of said fingers being provided with gripping means on a portion of its inner surface and an external surface which is of frusto-conical configuration convergent toward the upper end of said anchor ring member and extending to the end of each said finger, said external frusto-conical surfaces having a common conical axis;

a retainer ring member having a central axial bore with internal threads in the lower end portion of said bore whereby said retainer ring member is adapted for threading engagement with the externally threaded surface of said anchor ring member, said retainer ring having an upper bore portion defined by an internal frusto-conical surface which is convergent inwardly toward the upper end of the retainer ring, said internal frusto-conical surface being defined by a cone angle slightly larger than the cone angle which defines the external frusto-conical surfaces of said fingers and having a circular diameter at its widest end which exceeds the diametral distance between the frusto-conical surfaces on the exteriors of the finger tips whereby said fingers are receivable within the conical bore section of the retainer ring member as defined by said fruso-conical surface and said internal frusto-conical bore surface is adapted to engage said external frusto-conical surfaces of the fingers as the retainer ring member is threaded onto said anchor ring, said internal frusto-conical bore surface acting to wedge said fingers inwardly as said retainer member is threaded onto said anchor ring whereby said fingers are movable into gripping engagement with a casing disposed within said ring support device, and such support ring device having an annular upwardly facing surface provided by the upper end of said retainer ring member for supporting an apparatus on said casing.

2. A support apparatus as defined in claim 1 wherein said annular upwardly facing surface at the upper end of said support device is of generally V-shaped radial cross-section for supporting a packing means thereon comprised of packing rings of similar V-shaped cross-section whereby said packing means is adaptable for sealing between said casing and the inner wall of an outer casing or wellhead disposed thereabout.

3. A support ring device as described in claim 1 wherein said fingers are formed by a plurality of slots longitudinally extending a preselected distance from the upper end of said anchor ring member; and said finger gripping means are formed by internal threading of the central bore in the upper end portion of said anchor ring member.

4. A support ring device as described in claim 1 wherein said threaded radial bores are disposed with their axes coplanar and perpendicular to the central axis of said anchor ring member.

5. A support apparatus adapted to be mounted in a fixed sleeved relationship to a casing or tubing for supporting a packing, or the like, thereon, said support apparatus comprising:

an anchor member of a general cylindrical configuration and circular cross-section, said anchor member being provided with external circumferential threads over a portion of its external surface and a plurality of threaded bores circumferentially located with respect to said anchor and extending radially from the exterior lateral surface of said anchor member to the interior, said radial bores being adapted to receive threaded fasteners therein for securing said anchor member to said casing or tubing;

a second adjustable gripping means for securing said support apparatus to said casing or tubing, said second adjustable gripping means comprising a plurality of upwardly extending fingers on the upper end portion of said anchor member which are disposed circumferentially about said anchor member remote from said radial bores, gripping surfaces provided on the inner sides of said fingers;

a retainer ring member for adjustably clamping said fingers into gripping engagement with said casing or tubing, said retainer ring member being of general cylindrical configuration with a central bore therethrough and being provided with internal threads in a portion of said bore whereby said retainer ring member is adapted to be connected in threading engagement with said anchor member;

cooperative wedge means on said anchor member and said retainer ring member, said cooperative wedge means comprising first frusto-conical wedging surface means provided on the exterior of said anchor member at said fingers thereof and a second frusto-conical wedging surface means provided in the wall of said central bore of the retainer ring member whereby said first and second wedging surface means are cooperatively engaged when said retainer ring member is threadedly connected to said anchor member to thereby flex said fingers inwardly of said anchor member to grip a casing or tubing disposed therein, the gripping force exerted by said fingers being adjustable in correspondence to the degree of threaded engagement of said anchor member and retainer ring member; and a supporting surface provided by the upper end of said retainer ring member whereby said support apparatus is suitable for supporting a packing, or the like, on said casing or tubing.

* * * * *